US008425986B2

(12) United States Patent
Haile et al.

(10) Patent No.: US 8,425,986 B2
(45) Date of Patent: Apr. 23, 2013

(54) COMPOSITE NANOSTRUCTURE SOLID ACID FUEL CELL ELECTRODES VIA ELECTROSPRAY DEPOSITION

(75) Inventors: Sossina M. Haile, Altadena, CA (US); Konstantinos P. Giapis, Pasadena, CA (US); Aron Varga, Pasadena, CA (US); Nick Brunelli, Pasadena, CA (US); Mary Louie, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 403 days.

(21) Appl. No.: 12/700,998

(22) Filed: Feb. 5, 2010

(65) Prior Publication Data

US 2010/0227120 A1    Sep. 9, 2010

Related U.S. Application Data

(60) Provisional application No. 61/206,962, filed on Feb. 6, 2009.

(51) Int. Cl.
*B05D 1/06* (2006.01)
(52) U.S. Cl.
USPC .................... 427/483; 427/485; 427/486
(58) Field of Classification Search ............... 427/483, 427/485, 486
See application file for complete search history.

(56) References Cited

U.S. PATENT DOCUMENTS

| 7,250,232 | B2 | 7/2007 | Boysen et al. |
| 7,259,109 | B2 * | 8/2007 | Meagley ................... 438/778 |
| 2005/0095369 | A1 * | 5/2005 | Selman et al. ............. 427/458 |
| 2006/0014068 | A1 * | 1/2006 | Boysen et al. ............... 429/33 |
| 2006/0166838 | A1 * | 7/2006 | Collins et al. ............... 507/219 |

OTHER PUBLICATIONS

Taylor, "Disintegration of Water Drops in an Electric Field," Proc. R. Society London Ser. A, 1964, 280, 383-397.
Chang et al., "Liquid-vapor interface of methanol-water mixtures: a molecular dynamics study," J. Phys. Chem. B., 2005, 109, 5759-5765.
Dilmohamud et al., "Surface Tension and related thermodynamic parameters of alcohols using the Traube stalagmometer," Eur. J. Phys. 2005, 26, 1079-1084.

* cited by examiner

*Primary Examiner* — Frederick Parker
(74) *Attorney, Agent, or Firm* — Kilpatrick Townsend & Stockton LLP.

(57) ABSTRACT

The present invention provides a method of preparing a nanostructure material on a substrate. The method includes spraying an aqueous solution from a capillary to the substrate, wherein the aqueous solution includes an electrolyte and an alcohol. The method also includes applying an electrical bias between the capillary and the substrate, such that the electrolyte deposits on the substrate forming the nanostructure material. The present invention also provides the nanostructure material prepared by this method.

14 Claims, 9 Drawing Sheets

US 8,425,986 B2

COMPOSITE NANOSTRUCTURE SOLID ACID FUEL CELL ELECTRODES VIA ELECTROSPRAY DEPOSITION

CROSS-REFERENCES TO RELATED APPLICATIONS

This application claims priority to U.S. Provisional Application No. 61/206,962, filed Feb. 6, 2009, which is incorporated in its entirety herein for all purposes.

STATEMENT AS TO RIGHTS TO INVENTIONS MADE UNDER FEDERALLY SPONSORED RESEARCH OR DEVELOPMENT

The U.S. Government has certain rights in this invention pursuant to Grant No. W911NF-08-C-0072 awarded by the Army Research Office (ARO).

BACKGROUND OF THE INVENTION

Due to their high efficiency and fuel flexibility and their compatibility with inexpensive interconnect materials, intermediate temperature fuel cells are attractive alternatives to combustion engines for the conversion of chemical to electrical energy. Amongst fuel cell types suitable for intermediate temperature operation (100-300° C.) solid acid fuel cells (SAFCs) offer the unique benefit of a truly solid electrolyte, specifically, $CsH_2PO_4$, that, in turn, provides significant system simplifications relative to phosphoric acid or alkaline fuel cells. Despite these benefits, however, the power output of SAFCs have not yet reached levels typical of conventional polymer electrolyte or solid oxide fuel cells. In general, successes in reducing electrolyte losses, through fabrication of thin-membrane fuel cells, have outpaced successes in reducing electrode losses. While SAFCs with electrolyte thicknesses of 25-50 μm can be routinely fabricated, Pt loadings remain as high as ~4 mg/cm², and even at this level, the electrodes are responsible for the majority of the overpotential losses.

Because the components in typical SAFC electodes, Pt, $CsH_2PO_4$ and pores, can each transport only one species (electrons, protons and gas phase molecules, respectively), one can surmise that the electrocatalysis reaction is limited to the triple phase boundaries at which the electrolyte, catalyst and the gas phase are in contact and where the simultaneous and coordinated transport of electrons, ions, and gas molecules can occur. Maximization of the triple-phase boundary per unit projected area is thus a recurring theme in composite electrode systems. In the case of SAFC electrodes, the possibility of attaining a high density of TPBs as implied through the use of nanoparticle Pt has not been realized because of the typically large size of the electrolyte particles. Recent successes in incorporating submicron $CsH_2PO_4$ in SAFCs suggest that intimate mixing of nanosized particles of the two components (electrolyte and catalyst) would dramatically enhance the contact area between the two phases. A composite electrode must further ensure continuous pathways for ion, electron and gas phase transport. Accordingly, there is a need to to fabricate an interconnected, porous, three-dimensional nanostructured composite. Such a structure is expected to provide the dual benefits of enhanced electrochemical activity and reduced Pt loading.

The fabrication methodology utilized here is the electrospray technique, sometimes termed electrostatic spray deposition (ESD). The process relies on electrostatic forces to expel micrometer sized droplets from a charged liquid. The liquid is pumped through a capillary, and, under ideal conditions, the applied electric field causes the liquid to emerge in the shape of a cone, called the Taylor cone. The high electric field concentrated at the tip of the cone induces the emission of a fine spray of charged droplets. The electrospray method has been widely used to aerosolize liquids, and is particularly useful in the study of macromolecules. As a fabrication tool, the method has been largely limited to the preparation of polymeric nanofibers, and occasionally the deposition of thin films (where examples exist for polymers, ceramics and metals, although most studies involve polymers). The potential of ESD for the preparation of nanostructured, highly porous films of non-polymeric materials has been largely overlooked. Surprisingly, the present invention meets the need for electrode fabrication, as well as other needs, using the ESD method.

The present invention relies on the recognition that, if the liquid used for ESD is a solution of solvent and solute and sufficient evaporation occurs as the droplets are accelerated towards the grounded substrate, the resulting charge concentration induces break-up of the droplet and the ultimate deposition of sub-micron to nanoscale, solvent-free particles on the substrate. A wide range of chemical and physical parameters can be varied to tune the characteristics of the resultant structure which can span from dense thin films to porous electrodes. These parameters include solvent concentration, solution composition (affecting solution conductivity, surface tension, viscosity), spraying temperature, gas flow rate, and spray geometry (e.g. tip-to-substrate path length, spraying direction).

BRIEF SUMMARY OF THE INVENTION

In one embodiment, the present invention provides a method of preparing a nanostructure material on a substrate. The method includes spraying an aqueous solution from a capillary to the substrate, wherein the aqueous solution includes an electrolyte and an alcohol. The method also includes applying an electrical bias between the capillary and the substrate, such that the electrolyte deposits on the substrate forming the nanostructure material.

In another embodiment, the present invention provides a nanostructure material prepared by the method of the present invention, wherein the nanostructure material includes a solid acid of formula I:

$$M_aH_b(XO_tA)_c \qquad (I)$$

wherein radical M of formula I is a metal cation having a charge from +1 to +2. Radical X of formula I is S, Se, P, As, Si or Ge. Radical A is absent, or is selected from H or F. And each of subscripts a, b, c, and t of formula I is an integer from 1 to 10.

In still another embodiment, the present invention provides a nanostructure material having a plurality of structural arms each with at least one dimension of from 1 to 1000 nm and each including a solid acid of formula I.

In yet another embodiment, the present invention provides an aqueous solution including water, an alcohol, a solid acid electrolyte of formula I, and a surfactant.

BRIEF DESCRIPTION OF THE DRAWINGS

FIG. 3B also shows the structural arms of the nanostructure materials (see arrow).

DETAILED DESCRIPTION OF THE INVENTION

I. General

Figure 1:
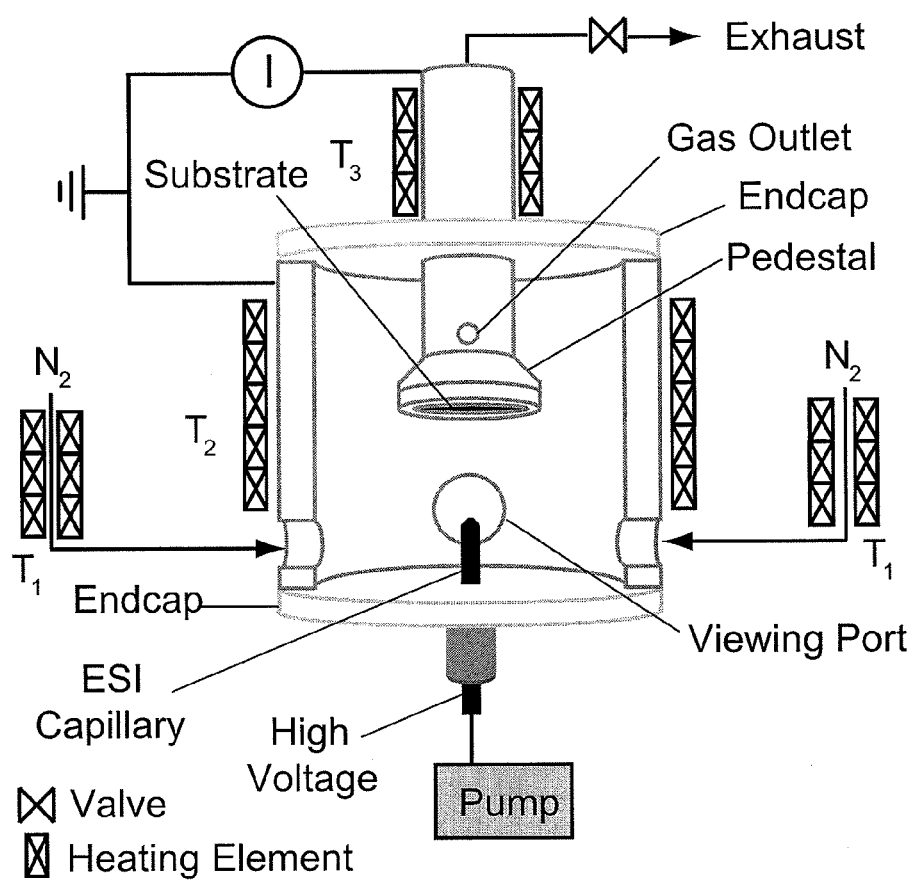
FIG. 1 shows a schematic of an electrospray setup.

The present invention provides a nanostructure material of the solid acid of formula I, having a plurality of structural arms having at least one dimension from 1 to 1000 nm. The solid acid nanostructure materials are fractal and porous in nature, and can include a catalyst. When a catalyst is included, the solid acid nanostructure material can be used as an electrode in an electrochemical device such as a fuel cell.

The present invention also provides a method of making such solid acid nanostructure materials by dissolving the solid acid electrolyte in an aqueous solution with an alcohol such as methanol. The aqueous solution is sprayed from a capillary to a substrate while applying an electrical bias between the capillary and the substrate. Without being bound by any theory, the aqueous solution forms droplets when sprayed from the capillary, such that during flight to the substrate, the solution forming the droplets evaporates, precipitating the solid acid electrolyte from the solution and forming solvent-free nanoparticles of the electrolyte. The solvent-free nanoparticles are then deposited on the substrate binding to one another to form structural arms having a fractal structure and at least one dimension from 1 to 1000 nm. The nanostructure material is formed from the structural arms. The structural arms of the present nanostructure materials are visible in FIGS. 3, 7-9 and 11, especially 3B (see arrow), 7B, 8B, 9B and 11B. Without being bound to any theory, the methanol of the aqueous solution reduces the surface tension of the solution promoting the reduction of the droplet sizes, and enhancing solvent evaporation.

The aqueous solution can also include a catalyst, such as Pt, suspended using a polymer such as polyvinylpyrrolidone acting as a surfactant. When the aqueous solution includes a surfactant, the nanostructure material can be subjected to an oxygen plasma to remove the surfactant.

The formation of the nanostructure material can be tuned based on the electrolyte and concentration thereof, the composition of the aqueous solution, the surfactant and concentration thereof, the presence of an catalyst and the concentration thereof, the flow rate of the aqueous solution during spraying, the electrical bias, the flow rate of the gas in the chamber, the temperature of the gas and of the substrate and aqueous solution, as well as other factors.

II. Definitions

"Nanostructure material" refers to a three dimensional structure in which at least a portion of the structure displays nanometer level dimensions. The nanostructure materials herein display a plurality of structural arms, each having at least one dimension of from 1 to 1000 nm.

"Substrate" refers to any material onto which the electrolyte can be deposited and the nanostructure material can be formed. Substrates useful in the present invention include, but are not limited to, metals, plastics, ceramics, electrolytes, composites, electrodes and carbon paper.

"Aqueous solution" refers to a solution having composed primarily of water. The aqueous solution can also include water miscible solvents which include, but are not limited to, alcohols, DMSO, DMF, tetrahydrofuran, and others.

"Alcohol" refers to a $C_{1-6}$ alkyl having from 1 to 3 hydroxy groups. Exemplary alcohols include, but are not limited to, methanol, ethanol, propanol, isopropanol, butanol, isobutanol, sec-butanol, tert-butanol, pentanol, hexanol, ethylene glycol and glycerol. Other alcohols include $C_{1-4}$ alkyl, $C_{1-3}$ alkyl, $C_{1-2}$ alkyl and $C_1$ alkyl with a single hydroxy group.

"Capillary" refers to a device or method of delivering a solution to the substrate of the present invention. Capillaries useful in the present invention include, but are not limited to, needle, capillary tube, orifice, wick, and post.

"Metal cation" refers to metallic elements of the periodic table that are positively charged as a result of having fewer electrons in the valence shell than is present for the neutral metallic element. Metals that are useful in the present invention include the alkali metals, alkali earth metals, transition metals and post-transition metals. Alkali metals include Li, Na, K, Rb and Cs. Alkaline earth metals include Be, Mg, Ca, Sr and Ba. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. One of skill in the art will appreciate that the metals described above can each adopt several different oxidation states. In some instances, the most stable oxidation state is formed, but other oxidation states are useful in the present invention.

"Carbon nanotube" refers to an allotrope of carbon that takes a form of cylindrical carbon molecules where the ends can be open or optionally capped with a hemisphere of the buckyball structure. The nanotubes can be single walled nanotubes (SWNTs) or multi-walled nanotubes (MWNTs), with diameters of only a few nanometers, and lengths of up to several millimeters, and more typically hundreds of nanometers.

"Surfactant" refers to any agent that alters the surface properties of the various components in the composition to stabilize the solution. Surfactants useful in the present invention include, but are not limited to, a non-ionic surfactant, a cationic surfactant, an anionic surfactant, an amphoteric surfactant, an ampholytic surfactant, a fatty alcohol, a fatty acid and fatty acid salts thereof. A surfactant's hydrophilic/lipophilic balance (HLB) describes the surfactant's affinity toward water or oil (1-20, with 1 being lipophilic and 20 being hydrophilic). The HLB of a blend of two surfactants equals the weight fraction of surfactant A times its HLB value plus the weight fraction of surfactant B times its HLB value (weighted average). Anionic surfactants useful in the present invention include, but are not limited to soaps including alkali soaps, such as sodium, potassium and ammonium salts of aliphatic carboxylic acids, usually fatty acids, such as sodium stearate. Additional anionic surfactants include organic amine soaps such as organic amine salts of aliphatic carboxylic acids, usually fatty acids, such as triethanolamine stearate. Cationic surfactants useful in the present invention include, but are not limited to, amine salts such as octadecyl ammonium chloride and quaternary ammonium compounds such as benzalkonium chloride. Non-ionic surfactants include, but are not limited to, polyvinylpyrrolidone and polyvinylalcohol. One of skill in the art will appreciate that other surfactants are useful in the present invention.

"Electrolyte" refers to any substance forming free ions in solution. Exemplary electrolytes include sodium chloride and solid acid materials such as $CsH_2PO_4$. "Solid acid" refers to compounds whose properties are intermediate between those of a normal acid, such as $H_3PO_4$, and a normal salt, such as $Cs_3PO_4$. In general, the chemical formula of the solid acids of the type used according to the present specification can be written as a combination of the salt and the acid. In general, solid acids are comprised of oxyanions, for example $SO_4$, $SO_3$, $SeO_4$, $SeO_3$, $SiO_4$, $PO_4$, $PO_5H$, or $AsO_4$, etc., which are linked together via O—H...O hydrogen bonds. The structure can contain more than one type of oxyanion group, and can also contain more than one type of metal counterion.

"Catalyst" refers a component that changes the rate of a chemical reaction but is not itself consumed in the chemical reaction. Catalysts useful in the present invention include, but are not limited to, metals such as Pd, Pt, Ag, Au, Rh and Ir. Other catalysts are useful in the present invention.

III. Nanostructure Materials

The present invention provides a nanostructure material including a solid acid. The nanostructure material includes a plurality of structural arms each having at least one dimension of from 1 to 1000 nm. The physical dimensions of nanostructures can vary considerably. The shortest dimension of a nanostructure is, by definition, in the nanometer range and is typically from about 0.1 nm to less than 1000 nm. The longest dimension can range from tens of nanometers to a macroscopic scale in the range of millimeters. In some embodiments, the nanostructure materials of the present invention can have diameters from 100 to 300 nm.

In some embodiments, the present invention provides a nanostructure material having a plurality of structural arms each with at least one dimension of from 1 to 1000 nm and each including a solid acid of formula I:

$$M_a H_b (X O_t A)_c \tag{I}$$

wherein radical M of formula I is a metal cation having a charge from +1 to +2. Radical X of formula I is S, Se, P, As, Si or Ge. Radical A is absent, or is selected from H or F. And each of subscripts a, b, c, and t of formula I is an integer from 1 to 10.

Metals useful as the metal cation of formula I include any metal that can form either of a +1 or +2 charge, such as, but not limited to, alkali metals, alkaline earth metals, transition metals and post-transition metals. Suitable alkali metals include Li, Na, K, Rb and Cs. Suitable alkaline earth metals include Be, Mg, Ca, Sr and Ba. Suitable transition metals include V, Cr, Mn, Fe, Co, Ni, Cu, Zn, Mo, Ru, Rh, Pd, Ag, Cd, W, Re, Os, Ir, Pt, Au, and Hg. Suitable post-transition metals include Tl, Sn, Pb, and Po. In some embodiments, radical M is a +1 metal. In other embodiments, radical M is an alkali earth metal such as Li, Na, K, Rb or Cs. In some other embodiments, radical M is Cs.

Radical X can be any suitable metalloid or non-metal that can be oxidized. Metalloids useful in the present invention include, but are not limited to, Si, Ge, As, Sb, Te and Po. Non-metals useful in the present invention include, but are not limited to, P, S and Se. In some embodiments, radical X is S, Se, P, As, Si or Ge. In other embodiments, radical X is Se, P, Si or Ge. In some other embodiments, radical X is P.

In some embodiments, the solid acids useful in the nanostructure materials of the present invention can have formula Ia:

$$M H_{1+c} (X O_3 A)_{1-c} (X O_4)_c \tag{Ia}$$

wherein radical M of formula Ia can be a metal cation having a +1 charge. Radical X of formula Ia can be S, Se, P, As, Si or Ge. Radical A of formula Ia can be H or F. And subscript c of formula Ia can be 0 or 1. In some other embodiments, radical M of formula Ia can be Li, Na, K, Rb, Cs, or Tl.

In other embodiments, the solid acids can have formula Ib:

$$M H_2 (X O_4) \tag{Ib}$$

wherein radicals M and X are as defined above for formula Ia. In some other embodiments, the solid acids can have formula Ic:

$$M H (X O_3 H) \tag{Ic}$$

wherein radicals M and X are as defined above for formula Ia. In still other embodiments, the solid acids can have the formula: $CsH_2(PO_4)$. Examples of solid acids include, but are not limited to, $CsH_2PO_4$, $CsH(PO_3H)$, $Cs_5(HSO_4)_3(H_2PO_4)_2$, $Cs_2(HSO_4)(H_2PO_4)$, $Cs_3(HSO_4)_2(H_2PO_4)$, $Cs_3(HSO_4)_2(H_{1.5}(S_{0.5}P_{0.5})O_4)$, $Cs_5H_3(SO_4)\cdot xH_2O$, $TlHSO_4$, $CsHSeO_4$, $Cs_2(HSeO_4)(H_2PO_4)$, $Cs_3H(SeO_4)_2$, $(NH_4)_3H(SO_4)_2$, $(NH_4)_2(HSO_4)(H_2PO_4)$, $Rb_3H(SO_4)_2$, $Rb_3H(SeO_4)_2$, $Cs_{1.5}Li_{1.5}H(SO_4)_2$, $Cs_2Na(HSO_4)_3$, $TlH_3(SeO_3)_2$, $CsH_2AsO_4$, $(NH_4)_2(HSO_4)(H_2AsO_4)$, and $CaNaHSiO_4$.

Figure 4:
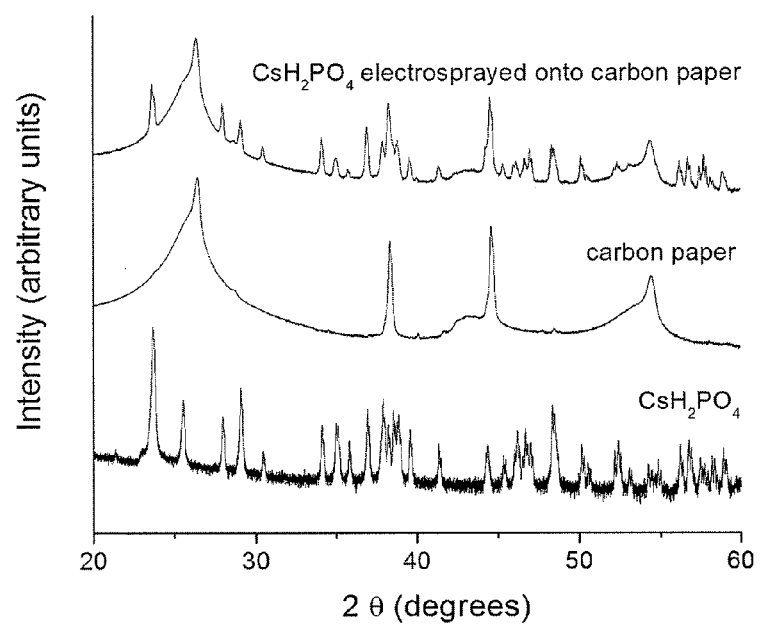
FIG. 4 shows the X-ray diffraction pattern of electrosprayed $CsH_2PO_4$ (top), blank carbon paper substrate (middle) and pure $CsH_2PO_4$ powder (bottom).
Figure 5:
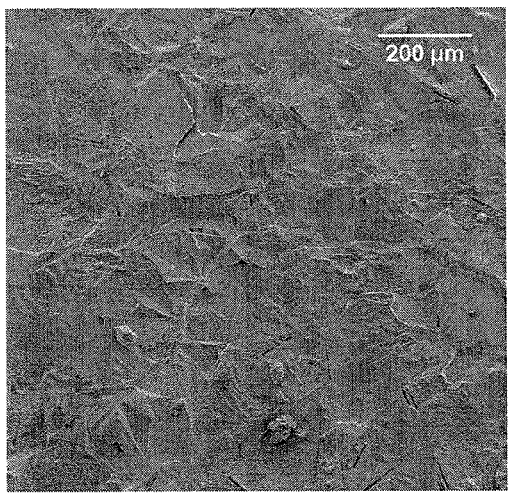
FIG. 5 shows a dense thin film of $CsH_2PO_4$ obtained via electrospray deposition using an aqueous solution without methanol, at a reduced gas flow rate and chamber temperature.
Figure 6:
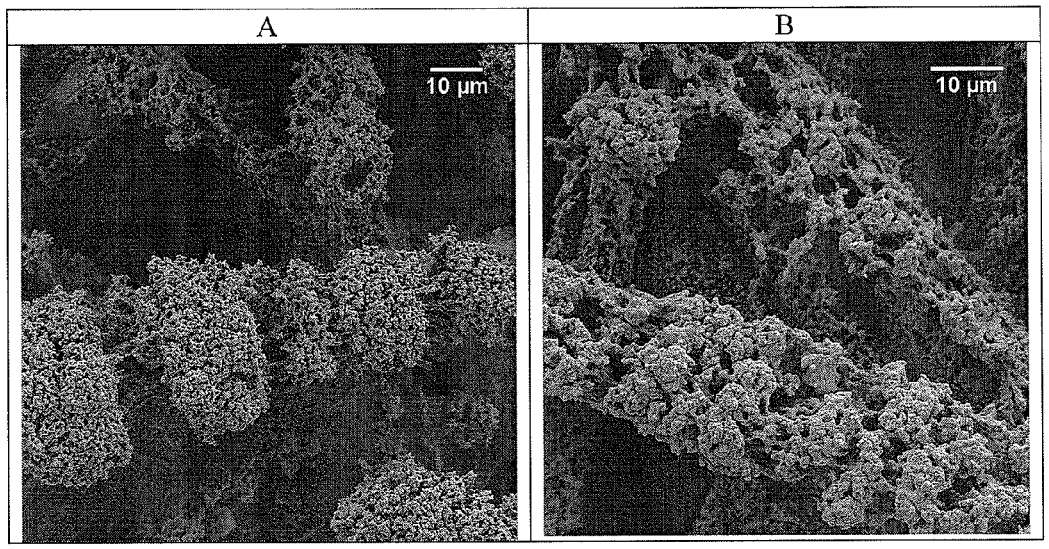
FIGS. 6A and 6B show agglomeration of the nanostructure after two days (6A) and seven days (6B) in ambient conditions. The nanostructures were prepared without surfactant, catalyst or carbon nanotube.
Figure 7:
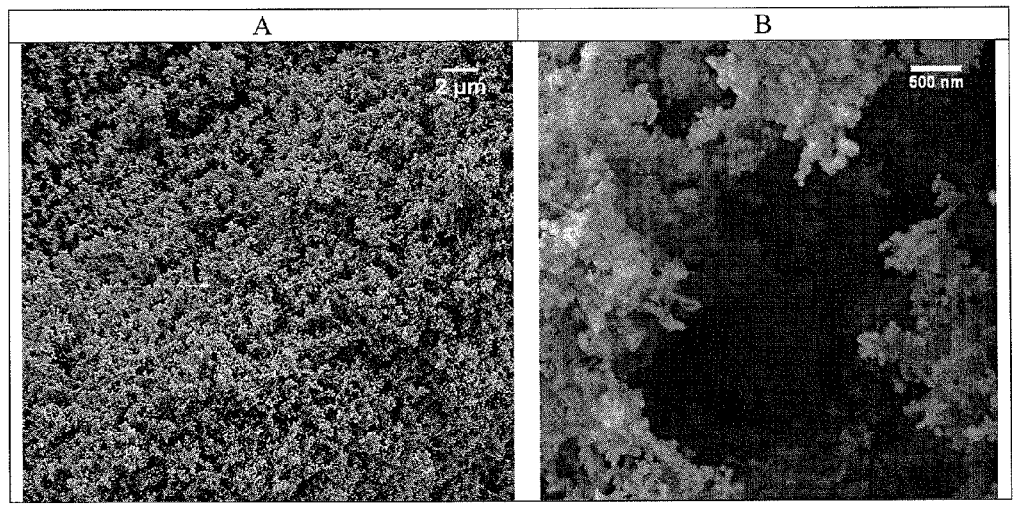
FIGS. 7A and 7B shows nanostructures prepared using $CsH_2PO_4$ with Pt-black as catalyst and polyvinylpyrrolidone as a surfactant, showing feature sizes of about 100 nm, with a smooth structure on the 10 µm scale.
Figure 8:
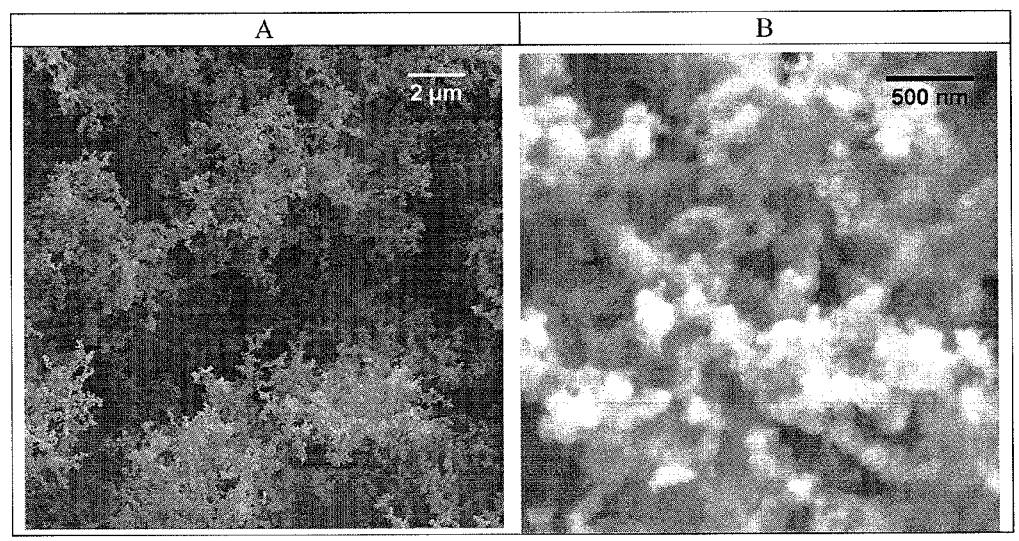
FIGS. 8A and 8B shows nanostructures prepared using $CsH_2PO_4$ with Pt on carbon and polyvinylpyrrolidone as a surfactant, showing feature sizes of about 100 nm, with a smooth structure on the 10 µm scale.
Figure 9:
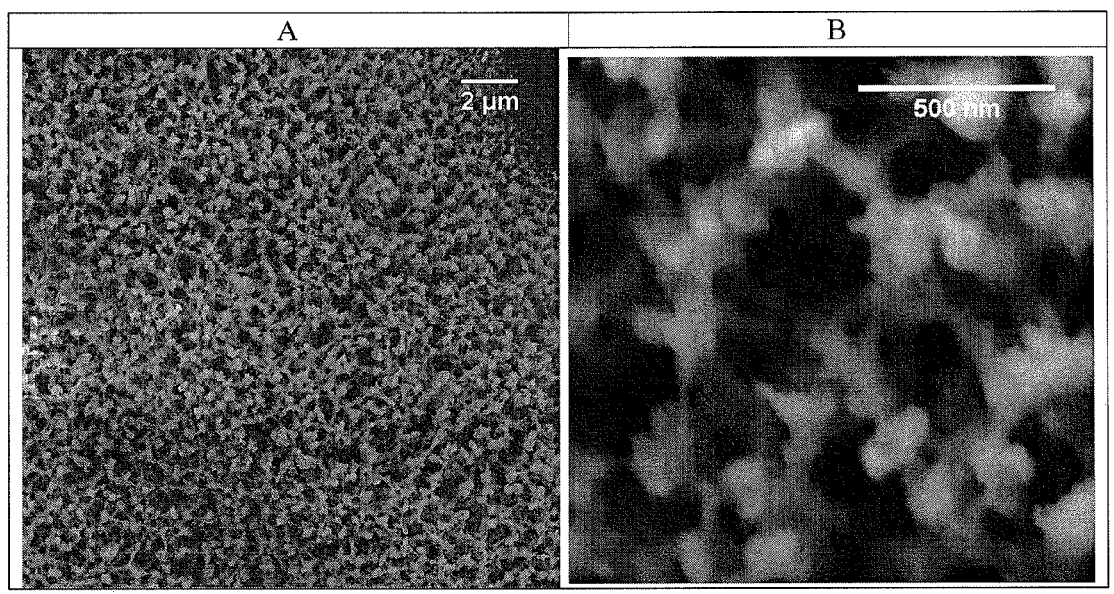
FIGS. 9A and 9B shows nanostructures prepared using $CsH_2PO_4$ with multi-walled carbon nanotubes and polyvinylpyrrolidone as a surfactant, showing feature sizes of about 100 nm, with a smooth structure on the 10 µm scale.
Figure 10:
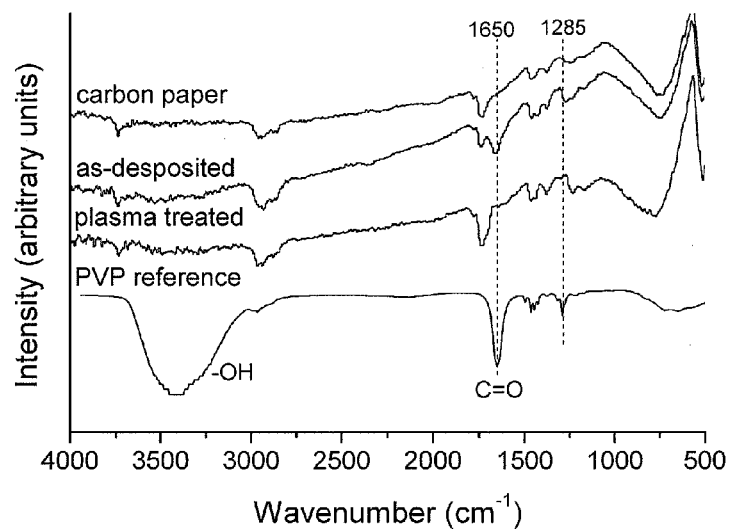
FIG. 10 shows the FTIR spectra of (i) blank carbon substrate; (ii) as-deposited composite electrode comprised of $CsH_2PO_4$, Pt and PVP; (iii) composite electrode after oxygen plasma treatment; and (iv) reference PVP (in KBr). Large, broad absorption band at ~3400 $cm^{-1}$ apparently due to residual water.
Figure 11:
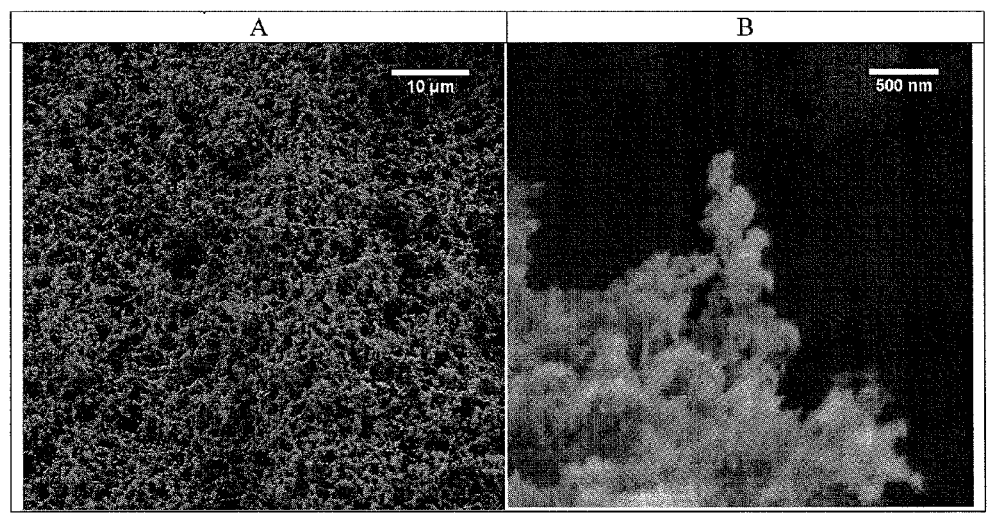
FIGS. 11A and 11B shows the stability of the nanostructure material prepared from electrosprayed $CsH_2PO_4$ with Pt-black and polyvinylpyrrolidone, after five days under ambient conditions following exposure to oxygen plasma treatment to remove the polyvinylpyrrolidone. Even after five days, the plasma-treated structure retains its 100 nm feature size.
Figure 12:
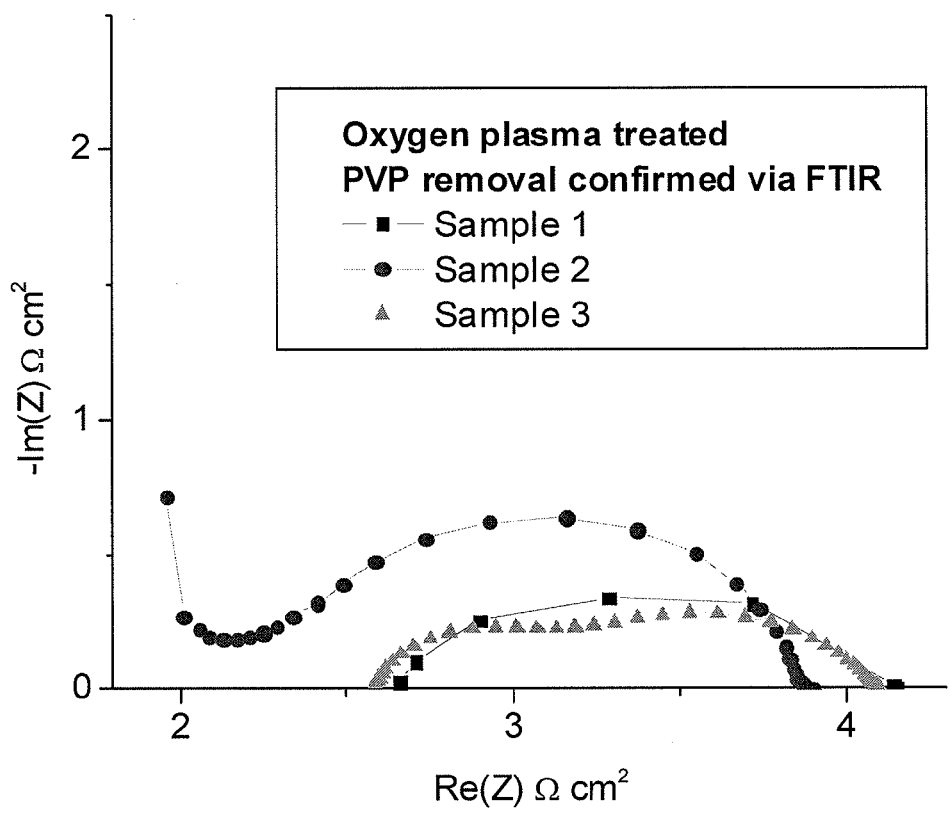
FIG. 12 shows the impedance spectra of symmetric cells prepared with a nanostructure material of electrosprayed $CsH_2PO_4$ with Pt-black and polyvinylpyrrolidone, with a Pt loading of 0.3+/− $mg/cm^2$ collected under humidified hydrogen, following oxygen plasma treatment of the electrosprayed electrodes.
Figure 13:
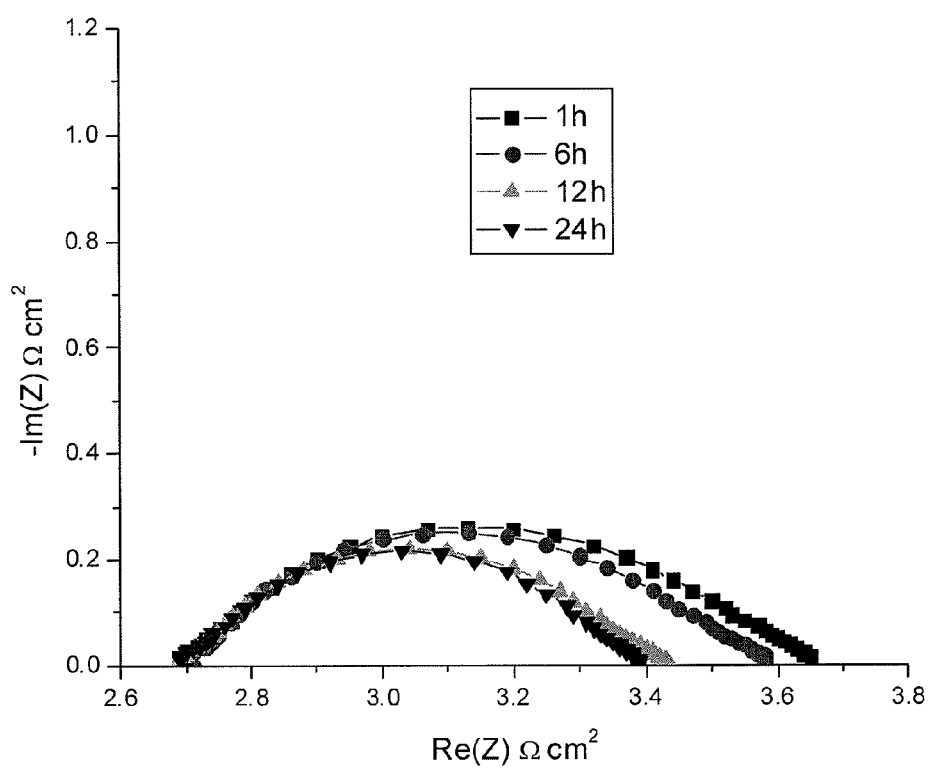
FIG. 13 shows the impedance spectra of symmetric cells prepared with a nanostructure material of electrosprayed $CsH_2PO_4$ with Pt-black and polyvinylpyrrolidone, with a Pt loading of 0.3+/−0.2 $mg/cm^2$ collected under humidified hydrogen over a time period of 24 hours. The total electrode impedance measured of 1.5 $\Omega cm^2$ is comparable to the 1.67 $\Omega cm^2$ obtained for mechanically milled electrodes of similar composition (~2:1 $CsH_2PO_4$:Pt by mass), but is obtained with a Pt loading of only 0.3+/−0.2 $mg/cm^2$, compared to 10 $mg/cm^2$ for the mechanically milled electrodes.

The nanostructure materials of the present invention can have different crystal structures. For example, when the electrolyte is $CsH_2(PO_4)$, the nanostructure material can have the X-ray diffraction pattern (XRPD) shown in FIG. 4, top. In some embodiments, the X-ray crystal structure of the $CsH_2(PO_4)$ nanostructure material has the 2-theta peaks in Table 2.

The nanostructure material can include a variety of other components, including, but not limited to, a catalyst, a carbon nanotube, and a surfactant. Catalysts useful in the present invention include, but are not limited to, Pt, Pd, Ag, Au, Rh, and Ir. Other useful catalysts include, but are not limited to, Ni, Co, Ru, and alloys thereof. The catalysts can be used in their pure form, or on a solid support, such as Pt-black or Pt-on-carbon. In some embodiment, the nanostructure material includes Pt-black.

Carbon nanotubes useful in the present invention include, but are not limited to, single-wall carbon nanotubes (CNTs) and multi-walled carbon nanotubes (MWCNTs). The carbon nanotubes can have any suitable orientation, such as armchair, zigzag and chiral (n,m). In addition, the carbon nanotubes can be chemically modified or doped with a metal. In some embodiments, the nanostructure material includes a multi-walled carbon nanotube. Other graphitic materials useful in the present invention include, but are not limited to, buckyballs and graphitic nanoribbons. In some embodiments, the carbon nanotubes and other graphitic materials can be metallic or semiconducting.

In other embodiments, the present invention provides a nanostructure material including at least one member selected from Pt, Pd, Ag, Au, Rh, Ir, a carbon nanotube and a surfactant.

The nanostructure materials can also be porous. In some embodiments, the nanostructure material has a porosity of from about 10% to about 90%.

The nanostructure materials of the present invention can be used to prepare electrodes for use in any electrochemical device. Suitable electrochemical devices include, but are not limited to, fuel cells, hydrogen separation membranes, membrane reactors, hydrogen sensors, and humidity sensors. The fuel cells can be hydrogen/air fuel cells, or direct alcohol fuel cells.

IV. Methods of Making

The present invention also provides a method of making the nanostructure materials of the present invention. In some embodiments, the present invention provides a method of preparing a nanostructure material on a substrate. The method includes spraying an aqueous solution from a capillary to the substrate, wherein the aqueous solution includes an electrolyte. The method also includes applying an electrical bias between the capillary and the substrate, such that the electrolyte deposits on the substrate forming the nanostructure material.

The substrate can be any suitable substrate. For example, substrates useful in the present invention include, but are not limited to, metals, ceramics, plastics, composites, electrodes, carbon paper and a uniaxially pressed dense pellet of $CsH_2PO_4$.

The electrolyte can be present in the aqueous solution in any suitable amount. For example, the electrolyte concentration can be from about 0.001 g/100 mL to about 100 g/mL, preferably from about 0.01 g/100 mL to about 10 g/100 mL, more preferably from about 0.1 g/100 mL to about 10 g/mL. In some other embodiments, the electrolyte includes a solid acid of formula I, described above. In still other embodiments, radical M of formula I can be Li, Na, K, Rb, Cs, Tl, Be, Mg, Ca, Sr or Ba. In yet other embodiments, the solid acid is $CsH_2PO_4$.

In other embodiments, the aqueous solution also includes an alcohol. Alcohols useful in the method of the present invention include, but are not limited to, $C_{1-4}$ alcohols, diols and triols. In some embodiments, the alcohol can be methanol, ethanol, propanol, isopropanol, butanol, isobutanol, sec-butanol or tert-butanol. In other embodiments, the alcohol can be methanol. Diols useful in method include, but are not limited to, ethylene glycol. Triols useful in the method include, but are not limited to, glycerol.

The alcohol can be present in the aqueous solution in any suitable amount. For example, the alcohol can be present in the aqueous solution in an amount of from about 1 to about 90 mol %. In other embodiments, the alcohol can be present in an amount of from about 25 to about 75 mol %. In some other embodiments, the alcohol can be present in an amount of about 50 mol %. In still other embodiments, the methanol is present in the aqueous solution in an amount of from about 1 to about 90 mol %. Other concentrations of the alcohol are useful in the present invention.

The aqueous solution can include a variety of other components, including, but not limited to, a catalyst, a carbon nanotube, and a surfactant. In some embodiments, the aqueous solution includes a catalyst, a carbon nanotube or a surfactant. Catalysts useful in the present invention are described above and can include Pt, Pd, Ag, Au, Rh, or Ir. The catalysts can be used in their pure form, or provided on a solid support, such as Pt-black or Pt-on-carbon. In other embodiments, the aqueous solution includes Pt-black. The catalyst can be present in the aqueous solution in any suitable amount, such as from about 0.001 g/L to about 1000 g/L, preferably from about 0.01 g/L to about 100 g/L, more preferably from about 0.1 g/L to about 10 g/L. Other concentrations of the catalyst are useful in the present invention.

Carbon nanotubes useful in the present invention include, but are not limited to, single-wall carbon nanotubes (CNTs) and multi-walled carbon nanotubes (MWCNTs), as described in detail above. Carbon nanotubes can be present in the aqueous solution in any suitable amount, such as from about 0.001 mg/L to about 1000 mg/L, preferably from about 0.01 mg/L to about 100 mg/L, more preferably from about 0.1 mg/L to about 10 mg/L. Other concentrations of the carbon nanotubes are useful in the present invention.

Any suitable surfactant is useful in method of the present invention. For example, the surfactants can be a non-ionic surfactant, a cationic surfactant, an anionic surfactant, an amphoteric surfactant, an ampholytic surfactant, a fatty alcohol, a fatty acid and fatty acid salts thereof. Surfactants useful in the present invention include, but are not limited to, polyvinylpyrrolidone and polyvinylalcohol. The surfactant can be present in the aqueous solution in any suitable amount, such as from about 0.01 g/L to about 500 g/L, preferably from about 0.1 g/L to about 100 g/L, more preferably from about 1 g/L to about 50 g/L. In some embodiments, the surfactant is present in an amount of about 20 g/L. Other concentrations of the surfactant are useful in the present invention.

In other embodiments, the method of the present invention also includes removing the surfactant from the nanostructure material. The surfactant can be removed by any means known in the art. For example, the surfactant can be removed by oxidizing the surfactant in an oxygen plasma. Other methods of removing the surfactant are known to one of skill in the art.

Other components for the aqueous solution include, but are not limited to, metal carbides and metal borides.

The electrical bias applied to the capillary and the substrate can be any suitable electrical bias, such as from about 0.01 kV to about 40 kV, preferably from about 0.1 kV to about 20 kV, more preferably from about 1 kV to about 10 kV.

Without being bound by any theory, the aqueous solution forms droplets when sprayed from the capillary, such that during flight to the substrate, the solution forming the droplets evaporates, precipitating the solid acid electrolyte from the solution and forming solvent-free nanoparticles of the electrolyte. The alcohol can act to increase conductivity of the aqueous solution and reduce surface tension. The increased conductivity of the aqueous solution can promote formation of smaller droplets of the aqueous solution. In addition, the reduced surface tension can promote evaporation of the aqueous solution following spraying such that the electrolyte precipitates and forms the solvent-free nanoparticles. The solvent-free nanoparticles are then deposited on the substrate binding to one another to form structural arms having a fractal structure and at least one dimension from 1 to 1000 nm. The nanostructure material is formed from the structural arms, which are themselves formed by the nanoparticles binding together.

In still other embodiments, the method also includes precipitating the electrolyte from the aqueous solution prior to deposition on the substrate. In yet other embodiments, the nanostructure material includes a plurality of structural aims formed by the deposition of the nanoparticles, wherein the structural arms have at least one dimension of from 1 to 1000 nm.

In another embodiment, the method includes spraying the aqueous solution from the capillary to the substrate, wherein the aqueous solution includes $CsH_2PO_4$, methanol, and polyvinylpyrrolidone, and applying an electrical bias between the capillary and the substrate, such that the $CsH_2PO_4$ precipitates from the aqueous solution prior to deposition on the substrate, thereby forming the nanostructure material.

The flow rate of the aqueous solution from the capillary can be any suitable flow rate. For example, the flow rate can be from about 0.01 mL/hour to about 100 mL/hour, preferably from about 0.1 mL/hour to about 10 mL/hour, more preferably about 1 mL/hour. Alternatively, the flow rate can be from about 0.1 μL/min to about 100 μL/min, preferably from about 1 μL/min to about 20 μL/min.

The capillary can be any suitable distance from the substrate. For example, the capillary can be from about 1 cm to about 10 cm from the substrate, preferably from about 2 cm to about 6 cm from the substrate. In some embodiments, the capillary is about 4 cm from the substrate.

As shown in FIG. 1, the method of the present invention take place in a chamber filled with a gas. The gas in the chamber can be any suitable gas. Exemplary gasses include, but are not limited to, nitrogen and argon. The gas can be static or flow from one end of the chamber to the other. The gas can flow at any suitable flow rate, such as from about 1 sccm to about 10,000 sccm, preferably from about 10 to about 5000 sccm, more preferably from about 100 sccm to about 1000 sccm. Other flow rates of the gas are useful in the present invention.

In another embodiment, the method of the present invention provides a nanostructure material having a solid acid of formula I. In some embodiments, the method of the present invention provides a nanostructure material having a solid acid of the formula $CsH_2PO_4$.

In some other embodiments, the present invention provides an aqueous solution including water, an alcohol, a solid acid electrolyte of formula I, and a surfactant. In other embodiments, the solid acid electrolyte is $CsH_2PO_4$. In still other embodiments, the aqueous solution includes water, methanol in an amount of about 50 mol %, $CsH_2PO_4$, polyvinylpyrrolidone and Pt-black.

V. Examples

Example 1

Preparation of Solid Acid Nanostructure Material

Preparation of Aqueous Solution. The electrolyte material $CsH_2PO_4$ was prepared by precipitation from an aqueous solution of $Cs_2CO_3$ and $H_3PO_4$, and the synthesis confirmed by x-ray powder diffraction. The material was redissolved into water or a methanol-water mixture at a concentration of 10-20 g $L^{-1}$ to serve as the electrospray solution. The methanol to water molar ratio was varied from 0:1 to 1:1 as a means of manipulating the solution conductivity and surface tension, parameters which can both influence the outcome of the electrospray process. In selected experiments various forms of Pt and carbon were added to the solution as a means of attaining their incorporation into the final electrode structure. These were platinum black (Alfa Aesar, Stk #43838, nom. ~30 m²/g); 40% platinum, on carbon black (Alfa Aesar, Stk #42204), and multiwalled carbon nanotubes (MWCNTs). The solids loadings in the solutions were 5 g $L^{-1}$ for the platinum black and platinum on carbon, and <1 mg $L^{-1}$ for the MWCNTs. To promote the suspension of these insoluble additives, the common surfactant, polyvinylpyrrolidone (Alfa Aesar, MW 8000), was added at a concentration of 20 g $L^{-1}$ and the solution continuously sonicated during electrospray deposition. Deposition was performed, in most cases, on carbon paper (Toray TGP-H-120), a substrate that is suitable for subsequent fuel cell fabrication because of its high porosity, good chemical stability, and high electronic conductivity. Furthermore, a uniaxially pressed dense pellet of CsH2PO4, routinely employed as the electrolyte, has been successfully utilized as the substrate.

Electrospray Deposition. The electrospray apparatus used for these experiments is shown in FIG. 1. The solution enters the deposition chamber (at a controlled flow rate between 5 and 15 μl/min) via a stainless steel capillary (ID 127 μm, OD 1.6 mm, L 50 mm). The capillary tip is machined to a point with a half-angle of ~45°, less than the Taylor cone half-angle of 49.3°. The sharpened end of the capillary opposes a heated aluminum pedestal (OD 25.4 mm), placed typically at a distance of 3 cm, onto which the substrate is mounted. An upwards spray geometry is employed so as to preclude direct contact of excess solution that can form as a result of instabilities in the spraying process with the substrate. Between the capillary and the pedestal a positive bias in the 4.5 to 5.5 kV range is applied, the precise value of which is selected so as to maintain a stable Taylor cone. These parts are enclosed in an aluminum housing with two plastic endcaps made of Delrin® (polyoxymethylene) to electrically isolate the capillary and the pedestal (the endcaps limit the upper operating temperature of the system to the plastic melting point of 175° C.). The housing is heated independently of the pedestal. Visualization of the Taylor cone was achieved with two glass windows (dia. ~12 mm) placed on opposite sides of the housing. The light from one window provided sufficient contrast to observe the Taylor cone directly through the second window. Two inlet and one outlet port in the housing accommodate flowing nitrogen, used as the drying gas. The gas is preheated to enhance the rate of solvent evaporation and was supplied at a flow rate of typically 1000 sccm, as controlled with a mass flow controller. The current carried by the flux of charged particles to the substrate was measured using a picoammeter (Keithley 480 Digital 3.5 Digit Bench Picoammeter) connected in series between the ground wire and the pedestal, providing a convenient way to monitor the spraying process and the stability of the Taylor cone. For the structures that included co-sprayed Pt-black, the Pt loading was estimated from the weight change of the sample. Because of geometric variabilities between different capillary tips, which have a nominal inner diameter of only 127 µm, fine control of the Pt deposition quantity by fixing the deposition time was not possible.

TABLE 1

| Parameters | Porous Nanostructure | Thin film |
|---|---|---|
| temperature (° C.) | 50-140 | 90 |
| voltage (kV) | 4.5-5.5 | 7.5 |
| sheath gas flow rate (sccm) | 500-1000 | 300 |
| mol % methanol in solution | 30-50 | 0 |
| CDP concentration (g/100 ml) | 1-2 | 2 |
| solution flow rate (ml/h) | 0.5-3 | ~1 |

Physical and Electrochemical Characterization. Scanning electron microscopy was conducted with a ZEISS 1550VP Field Emission SEM. X-ray diffraction data was collected with a Philips PW3040-Pro diffractometer. For those experiments in which catalysts were co-sprayed with the electrolyte for ultimate electrochemical characterization, the resulting structure was exposed to oxygen plasma treatment with the objective of removing the PVP and ensuring that the sites for electrocatalysis would not be blocked by the polymer. An in-house constructed plasma generator was employed for this purpose. The radio frequency (13.56 Hz) plasma was generated by inductively ionizing an argon-oxygen gas mixture (Ar flow: 7.5 sccm, $O_2$ flow: 2.5 sccm) with a copper wire coil wound around a quartz chamber. The electrosprayed carbon paper substrate was placed on a pedestal 10 cm downstream of the plasma and treated for 4 min using a plasma power of 150 W with a chamber pressure of 136 mTorr. The structures were examined by infrared spectroscopy (Nicolet 860 Magna series FTIR) before and after exposure to establish the efficacy of the oxygen plasma treatment.

Figure 2:
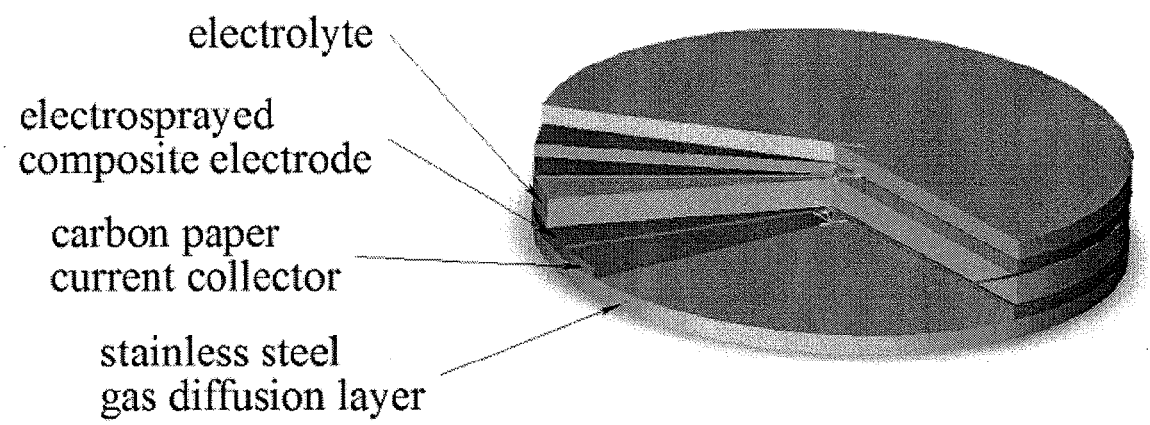
FIG. 2 shows a symmetric cell assembly having an stainless steel gas diffusion layer, a carbon paper current collector, an electrosprayed composite electrode, and an electrolyte layer.
Figure 3:
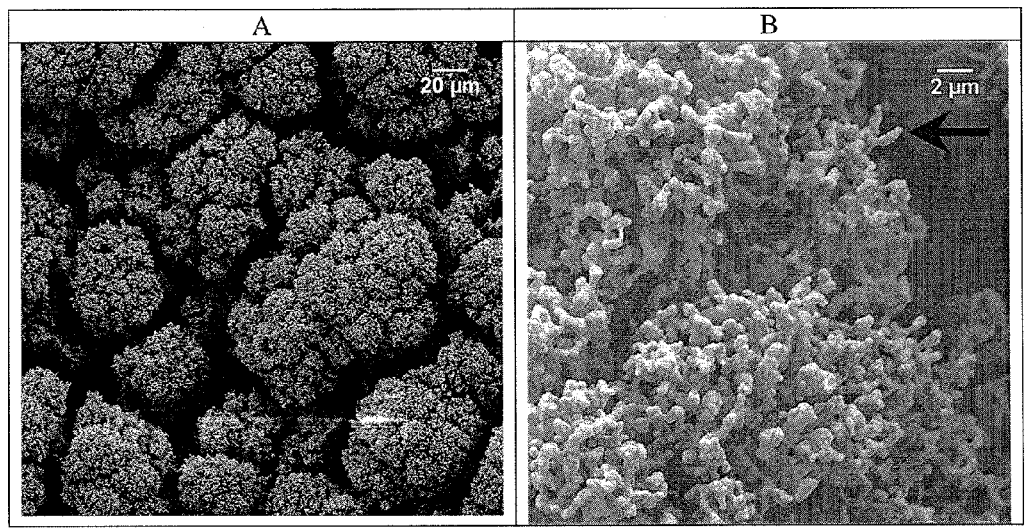
FIGS. 3A and 3B show nanostructure material prepared from $CsH_2PO_4$ via electrospraying, with an average feature size of 300 nm. These nanostructure materials were prepared using the process parameters in Table 1 (see Example 1), without the use of a catalyst or surfactant.

Symmetric electrochemical cells were fabricated using dense $CsH_2PO_4$ electrolyte and two identical, electrosprayed carbon paper pellets as the electrodes. The electrolyte was obtained by cold-pressing $CsH_2PO_4$ powder for 20 min under a uniaxial pressure of 34 MPa.[1] The electrosprayed electrodes were lightly pressed onto the electrolyte by a compression holder, tightening screws via a torque wrench at 0.1 Nm so as to avoid excessive damage of the microstructure and obtain good ionic conductivity across the interface. Two stainless steel porous plates were placed on either side of the symmetric cell in order to give uniform gas diffusion to the surface of the electrode as depicted in FIG. 2. Impedance data were collected under humidified hydrogen at 240° C. with a Solartron impedance analyzer operating at a voltage amplitude of 10 mV over frequencies ranging from 10 mHz to 1 MHz. Hydrogen was supplied at a rate of 30 sccm and humidified flowing through a water bubbler held at 80° C.

TABLE 2

XRPD of $CsH_2PO_4$ on carbon paper
CDP on carbon paper

| No. | Pos. [°2Th.] | Height [cts] | FWHM [°2Th.] | d-spacing [Å] | Rel. Int. [%] | Tip width [°2Th.] |
|---|---|---|---|---|---|---|
| 1 | 23.6376 | 27043.52 | 0.0768 | 3.76091 | 20.87 | 0.064 |
| 2 | 23.7587 | 15027.25 | 0.0576 | 3.74201 | 11.59 | 0.048 |
| 3 | 25.4986 | 26247.04 | 0.0768 | 3.49048 | 20.25 | 0.064 |
| 4 | 26.3987 | 129608 | 0.2784 | 3.37348 | 100 | 0.232 |
| 5 | 27.9773 | 14307.34 | 0.048 | 3.18662 | 11.04 | 0.04 |
| 6 | 29.0988 | 6225.94 | 0.1056 | 3.0663 | 4.8 | 0.088 |
| 7 | 30.4519 | 1367.81 | 0.1152 | 2.93306 | 1.06 | 0.096 |
| 8 | 34.1103 | 3372.15 | 0.0864 | 2.62639 | 2.6 | 0.072 |
| 9 | 34.9396 | 921.34 | 0.1536 | 2.56593 | 0.71 | 0.128 |
| 10 | 35.7492 | 342.46 | 0.0768 | 2.50965 | 0.26 | 0.064 |
| 11 | 36.9299 | 5812.64 | 0.0864 | 2.43208 | 4.48 | 0.072 |
| 12 | 37.8896 | 2843.51 | 0.0672 | 2.37265 | 2.19 | 0.056 |
| 13 | 38.294 | 14696.28 | 0.1536 | 2.34852 | 11.34 | 0.128 |
| 14 | 38.5202 | 3008.49 | 0.0768 | 2.33525 | 2.32 | 0.064 |
| 15 | 38.7512 | 2515.81 | 0.0576 | 2.32186 | 1.94 | 0.048 |
| 16 | 38.8325 | 2728.28 | 0.0576 | 2.31719 | 2.11 | 0.048 |
| 17 | 39.5551 | 1357.94 | 0.048 | 2.2765 | 1.05 | 0.04 |
| 18 | 41.3788 | 674.13 | 0.1344 | 2.18029 | 0.52 | 0.112 |
| 19 | 42.912 | 75.61 | 0.9216 | 2.10587 | 0.06 | 0.768 |
| 20 | 44.2404 | 2334.25 | 0.0576 | 2.04567 | 1.8 | 0.048 |
| 21 | 44.5476 | 20510.25 | 0.1056 | 2.03228 | 15.82 | 0.088 |
| 22 | 45.3258 | 780.7 | 0.0576 | 1.99917 | 0.6 | 0.048 |
| 23 | 45.9708 | 717.65 | 0.096 | 1.97261 | 0.55 | 0.08 |
| 24 | 46.1533 | 748.37 | 0.0864 | 1.96524 | 0.58 | 0.072 |
| 25 | 46.6736 | 1188.73 | 0.0672 | 1.94453 | 0.92 | 0.056 |
| 26 | 46.9987 | 2058.91 | 0.0672 | 1.93184 | 1.59 | 0.056 |
| 27 | 48.3153 | 2974.33 | 0.048 | 1.88223 | 2.29 | 0.04 |
| 28 | 48.4664 | 1431.94 | 0.0768 | 1.87671 | 1.1 | 0.064 |
| 29 | 48.5458 | 1191.79 | 0.0576 | 1.87383 | 0.92 | 0.048 |
| 30 | 50.1389 | 1673.01 | 0.1152 | 1.81796 | 1.29 | 0.096 |
| 31 | 50.4896 | 335.94 | 0.096 | 1.80615 | 0.26 | 0.08 |
| 32 | 52.1673 | 734.2 | 0.096 | 1.75194 | 0.57 | 0.08 |
| 33 | 52.3795 | 1076.32 | 0.096 | 1.74534 | 0.83 | 0.08 |
| 34 | 53.0641 | 875.72 | 0.1152 | 1.72443 | 0.68 | 0.096 |
| 35 | 54.4635 | 2572.09 | 0.1728 | 1.68338 | 1.98 | 0.144 |
| 36 | 56.2191 | 1339.21 | 0.0576 | 1.6349 | 1.03 | 0.048 |
| 37 | 56.7477 | 1633.67 | 0.0576 | 1.62092 | 1.26 | 0.048 |
| 38 | 57.4515 | 1047.23 | 0.0864 | 1.60273 | 0.81 | 0.072 |
| 39 | 57.7626 | 1938.72 | 0.0624 | 1.59483 | 1.5 | 0.052 |
| 40 | 58.1635 | 396.82 | 0.096 | 1.58479 | 0.31 | 0.08 |
| 41 | 58.8759 | 750.29 | 0.1056 | 1.5673 | 0.58 | 0.088 |

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method of preparing a nanostructure material on a substrate, the method comprising:
    spraying an aqueous solution from a capillary to the substrate inside a chamber, wherein the aqueous solution comprises a dissolved electrolyte;
    flowing a heated gas through the chamber; and
    applying an electrical bias between the capillary and the substrate, such that the electrolyte is precipitated from the aqueous solution to form nanoparticles which are then deposited on the substrate, thereby preparing the nanostructure material.

2. The method of claim 1, wherein the aqueous solution further comprises an alcohol selected from the group consisting of methanol, ethanol, propanol, isopropanol, butanol, isobutanol, sec-butanol and tert-butanol.

3. The method of claim 2, wherein the aqueous solution comprises methanol.

4. The method of claim 3, wherein the aqueous solution comprises from about 1 to about 90 mol % methanol.

5. The method of claim 1, wherein the electrolyte comprises a solid acid of formula I:

$$M_a H_b (XO_t A)_c \quad (I)$$

wherein
M is a metal cation having a charge from +1 to +2;
X is selected from the group consisting of S, Se, P, As, Si and Ge;
A is absent or selected from the group consisting of H and F; and
each of subscripts a, b, c, and t is an integer from 1 to 10.

6. The method of claim 5, wherein the metal cation M is selected from the group consisting of Li, Na, K, Rb, Cs, Tl, Be, Mg, Ca, Sr, and Ba.

7. The method of claim 5, wherein the solid acid comprises $CsH_2PO_4$.

8. The method of claim 1, wherein the aqueous solution further comprises at least one member selected from the group consisting of a catalyst, a carbon nanotube, and a surfactant.

9. The method of claim 8, wherein the catalyst is selected from the group consisting of Pt, Pd, Ag, Au, Rh and Ir.

10. The method of claim 8, wherein the catalyst comprises Pt black.

11. The method of claim 8, wherein the surfactant is selected from the group consisting of polyvinylpyrrolidone and polyvinylalcohol.

12. The method of claim 1, wherein the nanostructure material has a porosity of from about 10% to about 90%.

13. The method of claim 1, wherein the nanostructure material comprises a plurality of structural arms formed by the deposition of the nanoparticles, wherein the structural arms have at least one dimension of from 1 to 1000 nm.

14. The method of claim 1, wherein the method comprises:
spraying the aqueous solution from the capillary to the substrate, wherein the aqueous solution comprises $CsH_2PO_4$, methanol, and polyvinylpyrrolidone; and
applying an electrical bias between the capillary and the substrate, such that the $CsH_2PO_4$ precipitates from the aqueous solution to form nanoparticles that are deposited on the substrate, thereby forming the nanostructure material.

* * * * *